United States Patent
Vaughn et al.

(10) Patent No.: US 11,294,752 B2
(45) Date of Patent: Apr. 5, 2022

(54) VIRTUAL AGENT CORRECTIONS VIA LOG ANALYSIS

(71) Applicant: Kyndryl, Inc., New York, NY (US)

(72) Inventors: Garfield W. Vaughn, South Windsor, CT (US); Gandhi Sivakumar, Bentleigh (AU); Vasanthi M. Gopal, Plainsboro, NJ (US); Lakisha R. S. Hall, Upper Marlboro, MD (US)

(73) Assignee: Kyndryl, Inc., New York, NY (US)

( * ) Notice: Subject to any disclaimer, the term of this patent is extended or adjusted under 35 U.S.C. 154(b) by 293 days.

(21) Appl. No.: 16/427,581

(22) Filed: May 31, 2019

(65) Prior Publication Data

US 2020/0379836 A1   Dec. 3, 2020

(51) Int. Cl.
| | |
|---|---|
| G06F 11/07 | (2006.01) |
| H04L 51/02 | (2022.01) |
| G06F 11/34 | (2006.01) |
| G06K 9/62 | (2022.01) |
| G06F 9/451 | (2018.01) |
| G06F 40/30 | (2020.01) |

(52) U.S. Cl.
CPC .......... *G06F 11/0787* (2013.01); *G06F 9/453* (2018.02); *G06F 11/3476* (2013.01); *G06F 40/30* (2020.01); *G06K 9/6262* (2013.01); *H04L 51/02* (2013.01)

(58) Field of Classification Search
CPC .... G06F 9/453; G06F 9/6262; G06F 11/0787; G06F 11/3476; G06F 40/30; H04L 51/02
See application file for complete search history.

(56) References Cited

U.S. PATENT DOCUMENTS

| | | | |
|---|---|---|---|
| 9,633,674 B2 | 4/2017 | Sinha | |
| 2013/0268260 A1* | 10/2013 | Lundberg | G06F 40/40 704/8 |
| 2016/0026962 A1 | 1/2016 | Shankar et al. | |
| 2016/0132372 A1* | 5/2016 | Anderson | G06F 11/0709 714/15 |
| 2017/0206128 A1* | 7/2017 | Anderson | G06F 11/0778 |
| 2018/0077180 A1* | 3/2018 | Zhang | G06F 21/566 |
| 2018/0285768 A1* | 10/2018 | Karuppasamy | G06N 5/046 |
| 2018/0315415 A1 | 11/2018 | Mosley et al. | |
| 2019/0089656 A1* | 3/2019 | Johnson, Jr. | G10L 15/222 |
| 2020/0321086 A1* | 10/2020 | Rao | G16H 10/60 |
| 2020/0334123 A1* | 10/2020 | Chatterjee | G06F 11/079 |

OTHER PUBLICATIONS

List of IBM Patents or Patent Applications Treated as Related; May 31, 2019; pp. 1-2.

* cited by examiner

*Primary Examiner* — Seth A Silverman
(74) *Attorney, Agent, or Firm* — Fabian VanCott; Steven I. . Nichols

(57) ABSTRACT

According to a computer-implemented method, a virtual agent log data set is received which log data set includes information indicative of operation of a virtual agent. Machine logic analyzes the virtual agent log data set to identify an error that occurred in the operation of the virtual agent. The machine logic also determines an error correction for correcting conditions in the virtual agent that resulted in the error. The error correction is sent to the virtual agent.

20 Claims, 7 Drawing Sheets

VIRTUAL AGENT CORRECTIONS VIA LOG ANALYSIS

BACKGROUND

The present invention relates to virtual agent management, and more specifically to the correction of virtual agent operation based on an analysis of virtual agent log data sets.

Virtual agents are known. As stated in the Wikipedia entry for "software agent," a virtual agent is: "[A] computer program that acts for a user or other program in a relationship of agency, which derives from the Latin agere (to do): an agreement to act on one's behalf. Such "action on behalf of" implies the authority to decide which, if any, action is appropriate. Agents are colloquially known as bots, from robot. They may be embodied, as when execution is paired with a robot body, or as software such as a chatbot executing on a phone . . . or other computing device. Software agents may be autonomous or work together with other agents or people. Software agents interacting with people (e.g. chatbots, human-robot interaction environments) may possess human-like qualities such as natural language understanding and speech, personality or embody humanoid form . . . [Types of virtual agents] include intelligent agents (in particular exhibiting some aspects of artificial intelligence, such as reasoning), autonomous agents (capable of modifying the methods of achieving their objectives), distributed agents (being executed on physically distinct computers), multi-agent systems (distributed agents that work together to achieve an objective that could not be accomplished by a single agent acting alone), and mobile agents (agents that can relocate their execution onto different processors)."

Logs for operating virtual agents are known. These logs are sets of data that describe any aspect(s) of operating the virtual agent. The types of data typically stored in these virtual agent logs include the following types of data: (i) actual content of the conversation; (ii) time and date when the virtual agent instantiation began operating; (iii) operating system, or kernel, upon which the virtual agent is operating; (iv) virtualized computing environment (for example, virtual machine, container) in which the agent is operating; (v) times and dates of switching the virtual agent instantiation between various modes of operation (for example, idle mode and active mode); (vi) lines of code of the software of the virtual agent that are executed and times at which they are executed; (vii) content and times of requests for help (for example, queries) input to the virtual agent by users; (viii) content and times of responses to requests for help output by the virtual agent to users; (ix) content and times of requests for information output by to the virtual agent to data sources (for example, a request for information about a person that is stored in an online database); (x) content and times of responses to requests for information input by to the virtual agent by data sources; and (xi) information about abnormal operational events (for example, computer crashes).

SUMMARY

According to an embodiment of the present invention, a computer-implemented method is described. According to the computer-implemented method, a virtual agent log data set is received, which virtual agent log data set includes information indicative of operation of a virtual agent. Machine logic analyzes the virtual agent log data set to identify an error that occurred in the operation of the virtual agent. The machine logic also determines an error correction for correcting conditions in the virtual agent that resulted in the error. The error correction is sent to the virtual agent.

The present specification also describes a system. The system includes a log capture device to receive a virtual agent log data set that includes information indicative of operation of a virtual agent. The system also includes a log analysis device to 1) analyze the virtual agent log data set to identify an error that occurred in the operation of the virtual agent, 2) determine an error correction for correcting conditions in the virtual agent that resulted in the error, and 3) send the error correction to the virtual agent. A controller of the system manages operation of the log capture device and the log analysis device.

The present specification also describes a computer program product for managing a virtual agent. The computer program product includes a computer readable storage medium having program instructions embodied therewith. The program instructions are executable by a processor, to cause the processor to 1) receive, by the processor, a virtual agent log data set which includes information indicative of operation of a virtual agent, 2) analyze, by the processor, the virtual agent log data set to identify an error that occurred in the operation of the virtual agent, 3) determine, by the processor, an error correction for correcting conditions in the virtual agent that resulted in the error, and 4) send, by the processor, the error correction to the virtual agent.

DETAILED DESCRIPTION

Figure 1:
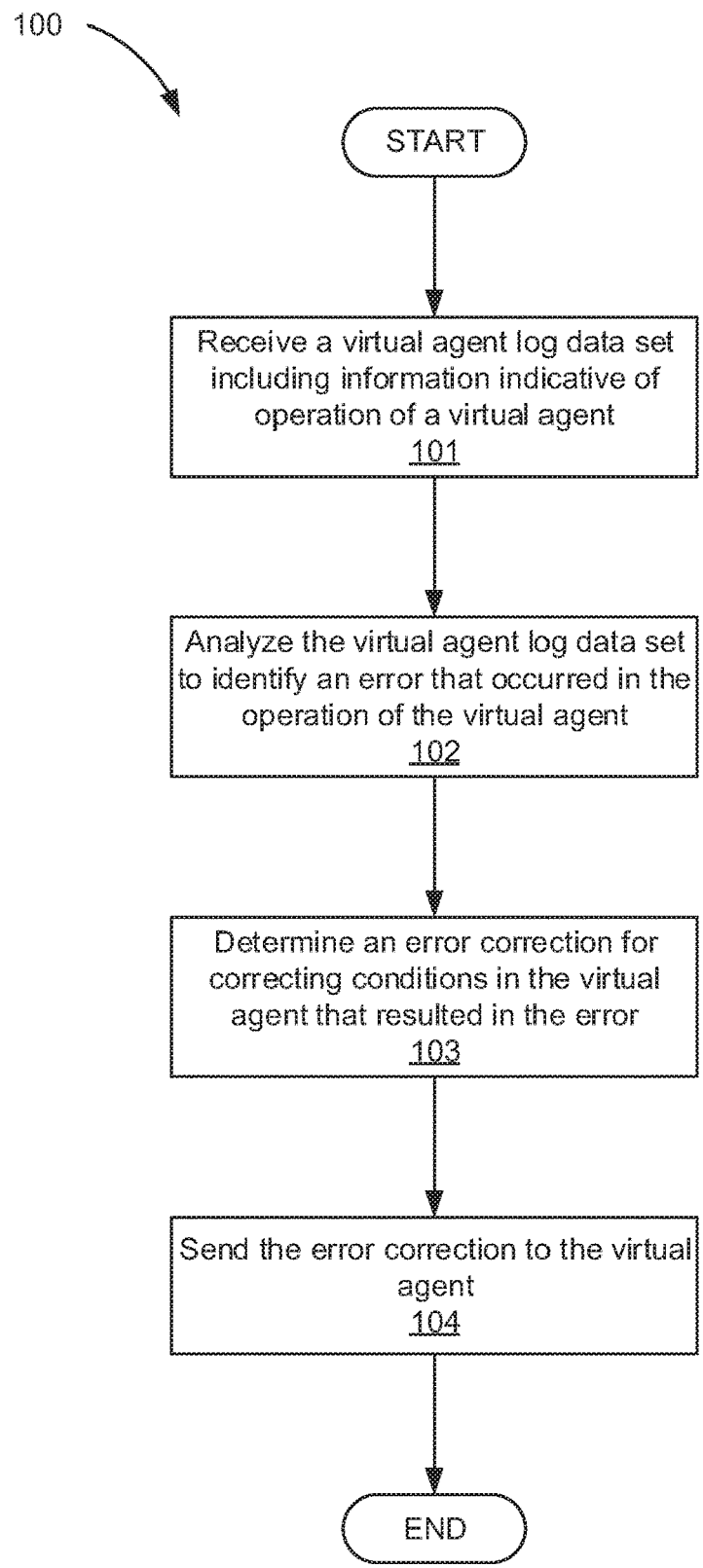
FIG. 1 depicts a flowchart of a method for correcting virtual agent operation via log analysis, according to an example of the principles described herein.

The present invention may be a system, a method, and/or a computer program product any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions escribed herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and for the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The industry trend is emerging towards "cognitive models" enabled via big data platforms. Such models, which may be termed as cognitive entities, are aimed to remember the past, interact with humans, continuously learn, and refine the responses used in the future. One of the emerging capabilities in the cognitive space is virtual agents. Virtual agents have been deployed in the field for performing various tasks and there is a need to monitor their performance, not only to demonstrate their capability as it becomes a commodity, but also to tune their performance.

Virtual agents may be deployed through federated or other patterns. Immaterial of the pattern in which they are deployed, there is a need to provide an open interface-enabled management capability. While real time-based monitoring has its own disadvantages, the present specification describes a logs-based solution for monitoring cognitive virtual agents.

While virtual agents are known, their performance may be enhanced. For example, as described above, virtual agents may be implemented in an attempt to replicate a human agent. For example, a user needing technical support may enter a chat for a business, and a virtual agent may be relied on to provide the needed assistance. However, due to the complexity of human language, a static virtual agent may not meet the demands of such an environment. In general, to change the operation of a virtual agent a manual update to the virtual agent may be performed. That is, an administrator may be required to manually update the code by which the virtual agent operates. As a specific example, if a virtual agent does not understand a particular correspondence from a user, an administrator may have to go in, and generate a response that the virtual agent would use when a subsequent instance of that correspondence is received. Such a process is complex and time-consuming and may be prohibitively so, such that virtual agents may not be feasible in certain applications.

Accordingly, the present systems, methods, and computer program products describe the monitoring and management of cognitive models, and of virtual agents in particular. Specifically, the present specification describes a system that tracks virtual agent interactions with a human, determines errors in those interactions, and then automatically provides updates such that future virtual agent interactions are robust against such errors.

The novelty of the present solution is to include an apparatus in products. The apparatus will pick the logs from chat nodes at various levels, correlate and identify errors, and display the errors at varying levels of severity. Examples of errors include nodes always being a pass through, nodes always responding as not known, and nodes unable to handle abbreviations, among others.

The apparatus, which may be termed a log based analyzer for virtual agents (LBAV) may extract the logs at various levels from the virtual agent nodes and may enable a graphical user interface (GUI) based interface to provide variegated criticality-based options and allow a user to drill through the logs at varying levels ex: Level 1 to lowest level.

Such a system, method, and computer program product enable the extending of log-based framework to natural language based virtual agents. That is, updates to the virtual agent operation are effectuated by a controller which receives as input, the chat logs of the virtual agent. Such a mechanism has not previously been available. That is, currently monitoring and management of cognitive models are not enabled through logs-based interface and cognitive capabilities do not have exclusive log-based monitoring as described in the present specification. The present specification provides for such monitoring and management.

As used in the present specification and in the appended claims, the term "a number of" or similar language is meant to be understood broadly as any positive number including 1 to infinity.

Turning now to the figures, FIG. 1 depicts a flowchart of a method (100) for correcting virtual agent operation via log analysis, according to an example of the principles described herein. As described above, a virtual agent is machine logic that interacts with a human or a system, and attempts to replicate human behavior. That is, the virtual agent may interact with humans, specifically learning from past human interactions, and adapts to provide pertinent information and responses. For example, a virtual agent may employ natural language processing to receive incoming correspondence which may be auditory or textual, and to discern a meaning and/or intent of the correspondence. Based on the identified meaning and/or intent, the virtual agent may provide an appropriate response, which may be simply to output text providing requested information, or to perform a variety of actions including re-directing a user's computing device to a particular web address, extracting certain information based on the correspondence, and providing that information to the human with whom its engaging. While specific reference is made to particular responses that a virtual agent may take, a variety of responses by the virtual agent may be carried out responsive to correspondence from a human user.

Logs of the interactions with man users are recorded and may be used by the virtual agents to refine its performance. For example, the virtual agents may be machine-learning virtual agents that, based on training data, can increase their performance. That is, as a machine-learning virtual agent receives and analyzes more and more examples of chat logs, the virtual agent can learn how to accommodate for 1) linguistic variations in spoken/typed correspondence and/or 2) different ideas communicated by a user. The present method (100) describes such a log-based update to virtual agent performance.

Specifically, the method (100) includes receiving (block 101) a virtual agent log data set that includes information indicative of operation of a virtual agent. Such log data sets include a variety of information from which virtual agent performance can be adjusted. In general, a virtual agent log refers to the correspondence between a virtual agent and a human or a virtual agent and a system. For example, a user may interact with a chatbot to make an inquiry regarding a product offered by a company. Responsive to the request for information, the chatbot virtual agent may return product information, such as product specifications, pricing, options, quality assurance information etc. The content of the conversation may be referred to as the log. In addition to receiving (block 101) the chat log, the system depicted in FIG. 2 may receive other data along with the log. This additional data as well as the log itself may be referred to as the virtual agent log data set. The data set may include a variety of pieces of information including, but not limited to, a time and date when the correspondence began, operating characteristics such as an operating system, kernel or virtual environment in which the virtual agent is operating, actions executed by the virtual agent as well as timestamps associated with the actions, the user input, the virtual agent responses, the output responses by the virtual agent, and information about abnormal operational events.

In some examples, the information includes user feedback. For example, throughout the course of the interaction, a user may be dissatisfied with the response of the virtual agent. Accordingly, the user may transmit, via an icon selection or another mechanism, an indication that the virtual agent is not performing satisfactorily. For example, when a user asks, "what is the battery life on a model 300 laptop," a virtual agent may respond, "below are the physical dimensions of the battery of the model 300 laptop." As the virtual agent output was not responsive to the question, a user may indicate, for example via a thumbs down icon, that the response was not helpful. This user feedback may be provided as part of the received (block 101) virtual agent log data set. In some examples, the virtual agent log data set (block 101) may be received remotely, for example from a server that collects and stores the virtual agent log data set. In another example, the log data set is received from the same computing device that executes the log analysis.

The method (100) also includes analyzing (block 102) the virtual agent log data set to identify an error that occurred in the operation of the virtual agent. As described above, in some examples, the analysis may be based on received user feedback. That is, a user interacting with the virtual agent may manually indicate an error in the operation of the virtual agent. As a specific example, the user input may indicate that the virtual agent did not correctly understand the request input by the user. As another example, the user input may indicate that the virtual agent provided incorrect or irrelevant material. In either of these cases, an error is identified by the presence of a tag, flag, or other metadata indicating user dissatisfaction with the operation of the virtual agent and why the operation of the virtual agent was unsatisfactory.

In yet another example, analyzing (block 102) the virtual agent log data set includes performing natural language processing on the virtual agent log data set. In general, natural language processing refers to the operation of a device to understand and process human languages. That is, computing devices may by design understand coding languages. However, human languages are much more unstructured, and thereby difficult to understand. For example, certain parts of speech such as sarcasm or rhetoric is not inherently understood by a computing device. Moreover, in coded languages, there may be finite ways to say certain things. By comparison, in spoken or written human language a particular idea/meaning may be conveyed using any variety of words or syntax.

Accordingly, a natural language processor reads, understands, and internalizes human languages. A natural language processor thereby accepts as input unstructured text, such as the correspondence between a human user and a virtual agent, and puts it into a form understandable by a computing device, such that the computing device can execute operations based on the language. Such a natural language processor may implement a variety of techniques including syntactic analysis to determine how the correspondence aligns with grammatical rules. Natural language processing may also include semantic analysis to understand a meaning of text. While particular reference to natural language processing has been made, other methods of natural language processing may be implemented in accordance with the principles described herein. Suffice it to say that by using natural language processing of both the input by a human user and the responses by a virtual agent, the system depicted in FIG. 2 may determine whether an error occurred or not.

As a simple example, a user may input the text, "could you please let me know the weather in Akron, Ohio." Responsive to this, the virtual agent may respond with the phrase, "traffic is congested on highway 15." A natural language processor may identify keywords in the user's statement of "weather" and "Akron, Ohio." The natural language processor may also identify keywords in the response of "traffic" and "highway 15." Accordingly, via natural language processing, the system may determine an error occurred as the keywords identified in the response do not match with the keywords identified in the request.

As yet another example, a user may ask "What discount price options am I eligible for?" to which a virtual agent responds, "Your account balance is $123.45". As in the example previously presented, here the natural language processor may identify keywords of "discount" and "price" in the user's request and the keywords of "account" and "balance" in the virtual agent response and determine, with some level of confidence, that an error has occurred.

In another example, the natural language processor may compare multiple original requests with associated responses over time to identify if a pattern exists as to why errors are being made. Once identified, the system can be updated/refined with new logic that will reduce the causation of such errors.

The errors determined by natural language processing may include any variety of types. For example, it may be deemed an error if a virtual agent cannot understand abbreviations used by a human user. In another example, an error of the virtual agent may be that the virtual agent does not respond to a user correspondence. As yet another example, an error of the virtual agent may be to hand off a conversation to a human agent, when such is not needed. That is, under the expected course of operation, a conversation with a human user may become too complex, such that the virtual agent hands off the conversation to a human agent. However, it may also be the case that a virtual agent hands off the conversation at a point in the conversation that is not effective.

As yet another example, an error may be that a virtual agent did not understand the correspondence. As described above, this may be evaluated by analysis of the keywords identified in both the response and the request, a difference in the keywords indicting the virtual agent did not fully understand the initial request.

Based on such a response, an error correction for correcting conditions in the virtual agent that resulted in the error are determined (block 103). That is, based on the identified error, the system may implement one or multiple corrections. In some examples, the determined (block 103) corrections are based on user feedback. That is, an administrator may be notified of the response and may input a correction into the virtual agent machine logic so as to prevent such an error.

In another example, the determination (block 103) of the error correction may be performed by the computing system itself. For example, the conversation that includes the error may be added to a training data set for the virtual agent and may be flagged as an example of an incorrect response. That is, as described above, natural language processors and machine-learning devices rely on training data sets to enhance their performance. That is, the training data set may include interactions that are known to be satisfactory and may also include interactions that are known to be unsatisfactory. From this data set, the system can determine traits/commonalities of satisfactory responses and incorporate those into its operation. The system also determines traits/commonalities of unsatisfactory responses and avoids incorporating these into its operation. Accordingly, by adding a conversation that includes an error into a training data set and flagging it as an example of an incorrect response, additional data is provided upon which the virtual agent system can learn what is acceptable and what is not.

For example, given the case where a user asks "What discount price options am eligible for?" and the virtual agent responds with "Your account balance is $123.45". If this has been marked as an error, the system learns and is able to identify the pattern associated with balance as a separate entity from discount price options and may amend the flow. Next time, when the user asks the question about discount price options, the system correctly responds to the request.

Similarly, by adding a conversation that is indicated as being satisfactory (either via user input or natural language processing) and flagging it as an example of a correct response, additional data is provided upon which the virtual agent system can learn what is acceptable and what is not.

When machine logic, for example, software according to some embodiments of the present invention, determines an error and/or error correction, the following types of virtual agent log data may be especially useful: content and times of requests for help (for example, queries) input to the virtual agent by users and content and times of responses to requests for help output by the virtual agent to users. Different content and long differences in time may indicate a difficulty in the virtual agent understanding the request. Another type of virtual agent log data that may be useful is content and times of responses to requests for information input by to the virtual agent by data sources; and information about abnormal operational events. For example, an abnormal operational event may indicate that a virtual agent incorrectly processed the request. Yet another type of virtual agent log data that may be useful is user input associated with the log. That is, user input indicating either satisfactory or unsatisfactory virtual agent operation is a direct indication of the operation of the virtual agent and can be used to determine (block 103) error correction.

The error correction may then be sent (block 104) to the virtual agent. For example, the natural language processor of the virtual agent may be updated based on the updated training set. That is, as described above, conversations with and without errors may be added to the training data set and appropriately flagged. A natural language processor may be updated with the updated training set so that the feedback associated with those conversations can be properly accounted for and used to build the experience base of the natural language processor. As described above, in some examples sending (block 104) the error correction may include manual update by a user. For example, a user may insert additional machine logic that accounts for and is robust against future occurrences of this particular error.

Figure 2:
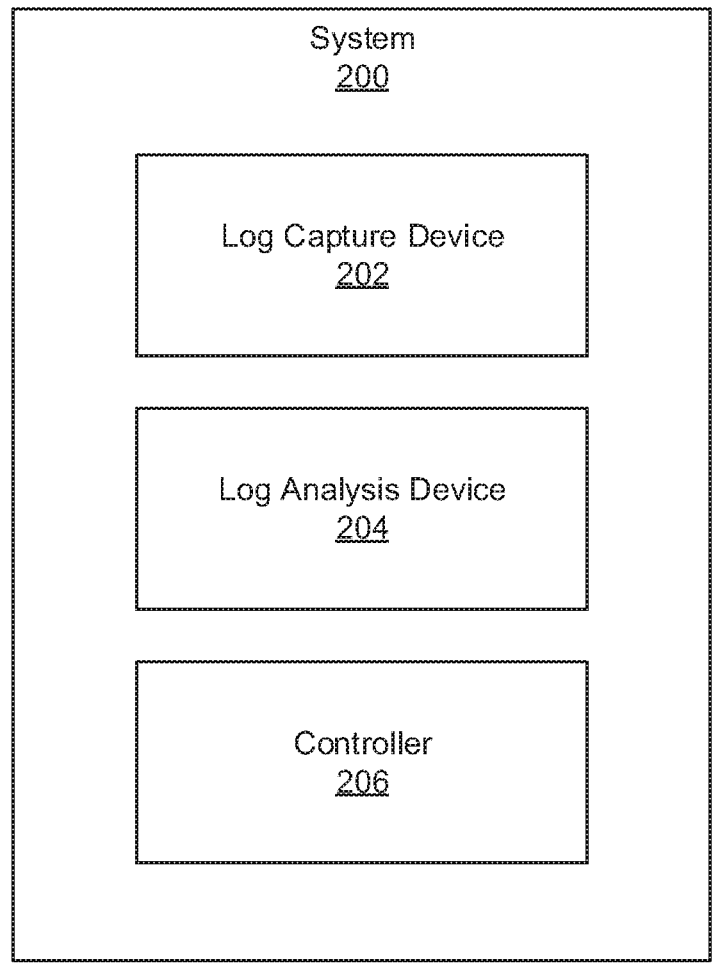
FIG. 2 depicts a system for correcting virtual agent operation via log analysis, according to an example of principles described herein.

FIG. 2 depicts a system (200) for correcting virtual agent operation via log analysis, according to an example of principles described herein. To achieve its desired functionality, the system (200) includes various components. Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory. In another example, one processor may execute the designated function of each of the components.

The system (200) includes a log capture device (202) to receive a virtual agent log data set, which log data set includes information indicative of operation of a virtual agent. That is, the virtual agent interacts with a user via at least one of auditory and textual communication. As a specific example, the virtual agent may be implemented as a voiced system that a human user may interact with over the phone. In this example, the log capture device (202) may include a speech-to-text converter to translate the audio communication into a text communication and then to store the text communication.

In another example, the virtual agent may be implemented as a chatbot that interacts through textual real-time communication with a human or system user. In this example, the log capture device (202) stores the text communication.

The log capture device (202) may receive (FIG. 1, block 101) the virtual agent log data set as described in connection with FIG. 1. That is, as described above, the virtual agent log may include the correspondence between a virtual agent and either a human user or a system user. The log data set includes this information as well as metadata that is associated with the log, which metadata may include information such as timestamps on requests by a human user and responses by the virtual agent as well as code executed by the virtual agent in generating the responses.

The system (200) also includes a log analysis device (204). The log analysis device (204) performs multiple operations. That is, the log analysis device (204) may analyze (FIG. 1, block 102) the virtual agent log data set to identify an error that occurred in the operation of the virtual agent as described above in connection with FIG. 1. For example, the log analysis device (204), using any of the methods described above, may identify an error, for example based on user input and/or machine learning and natural language processing.

In some examples, in addition to identifying the errors, the log analysis device (204) may associate the errors with a node on which they occurred. That is, a virtual agent includes various nodes. Each node may provide virtual agent services related to a particular topic. For example, a first node of a virtual agent relating to technical support for a home entertainment system may provide technical support regarding a receiver of a home entertainment system while a second node of a virtual agent may provide technical support regarding wiring of a home entertainment system. Different conversational contexts may implement natural language processing that is based on different norms. For example, certain unstructured phrases may be more used in one context than another. Accordingly, by providing nodes that can handle different specific aspects of a communication, greater functionality is provided by the virtual agent by implementing nodes that are particularly trained for a particular context. In this example, the log analysis device (204) identities the errors based on a node of the virtual agent where they originate. In this optional example, more effective corrective action may be implemented as an error may be more particularly identified with the node where it occurred.

The log analysis device (204) also determines (FIG. 1, block 103) the error correction for correcting conditions in the virtual agent that resulted in the error as described above in connection with FIG. 1. That is, the log analysis device (204) as described above determines how to correct the error, which determination of how to correct the error may be executed by a natural language processor. In this example, the natural language processor, based on a training set of data that incudes the conversation with the error, can determine how to properly respond to such a request. The log analysis device (204) then sends (FIG. 1, block 104) the error correction to the virtual agent, by for example, updating the natural language processor with the updated training data that includes the conversation from which the error resulted.

The system (200) also includes a controller (206) to manage the operation of the log capture device (202) and the log analysis device (204). That is, the controller (206) provides the instructions regarding how the log capture device (202) captures the log data set and how the log analysis device (204) analyzes the virtual agent log data set.

Figure 3:
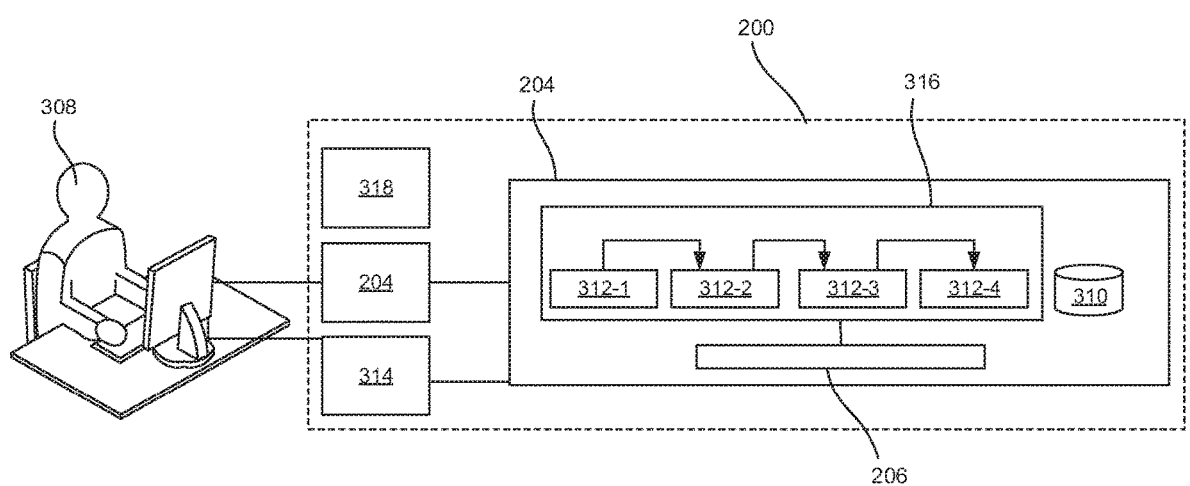
FIG. 3 depicts a system for correcting virtual agent operation via log analysis, according to another example of principles described herein.

FIG. 3 depicts a system (200) for correcting virtual agent operation via log analysis, according to another example of principles described herein. As described above, a human user (308) may interact with a virtual agent, which virtual agent includes hardware components and machine logic to carry out the functionality of interacting with the human user (308) and providing relevant feedback/output to the human user (308).

As described above, a log capture device (204) of the system (200), which may be referred to as a LBAV log capture device, captures the logs across each node. That is, the log capture device (204) records and stores textual and/or auditory correspondence between the human user (308) and the virtual agent.

As described above, the system (200) may include a natural language processor (318) to receive information regarding an identified error and to update a natural language operation based on the identified error. That is, the natural language processor (318), is used to determine a meaning/intent of human user (308) input and learns how to do this based on learned patterns to identify the meaning. The natural language processor (318) may be updated with a new training data set to more accurately and precisely interpret subsequent chat communications, thus providing for more relevant and specific responses provided by the virtual agent (200). FIG. 3 also depicts the controller (206), which may be referred to as a LBAV controller (206), which performs orchestration and choreography across the sub components of the virtual agent (200).

The system (200) may also include a database (310) that stores the virtual agent log data sets. That is, the database (310) may include the logs themselves, as well as metadata associated with the logs. The database (310) also may store identified errors and classifications of the identified errors. That is, as will be described below, the log analysis device (204) may classify the identified errors in a variety of ways and the database (310) may include a mapping between the errors and the associated classifications.

In some examples, the database (310) may be searchable. Specifically, the system (200) may include a user interface (314) that allows a user to view and inspect the database (310). To aid in the inspection of database (310) information, the system (200) may include a consolidator (316) to hierarchically group errors. Specifically, the consolidator (316) consolidates the events, (i.e., errors) at various levels of logs and stores the logs in the database (310). For example, the consolidator (316) identifies similar errors, regardless of the level (node) in which they occur. Accordingly, the errors may be correlated. Such a correlation allows for easier identification of causation patterns. Moreover, once an error correction is determined and generated, it can be applied to address all related errors that are correlated.

For example, the consolidator (316) may hierarchically group errors. For example, errors could be grouped at a lowest level (312-1), which may be errors per node. The different node-level errors may be grouped at a higher level (312-2), tier example by grouping errors that are associated with a few related nodes together. Such errors may be hierarchically grouped at increasingly abstract (312-3, 312-4) levels.

As a specific example, errors related to a "discount price" log, and a user "address" log may be grouped together in a "user" group. The user group may be grouped with a "balance" group into an "account" group, which may further be grouped with other "account" groups into a "bank" group. Accordingly, if a user were to ask a question regarding a balance, but the request is received at a node related to So when a question is asked about balance, if the response comes from the log of a "discount price" node, then the system may identify the right group within the hierarchy and associates an answer with the right node.

The grouping of errors, searchable database (310), and user interface (314) enables a drill through function to varying levels of severity and to drill through the events for the selected event. That is, the system (200) provides a graphical user interface (GUI) based interface, which may be referred to as a log based analyzer for virtual agents (LBAV), for back end-based configuration to enable the capture of logs at varying levels of abstraction, such levels of abstraction being level 1 (per node) to multi-level (groups of node).

Figure 4:
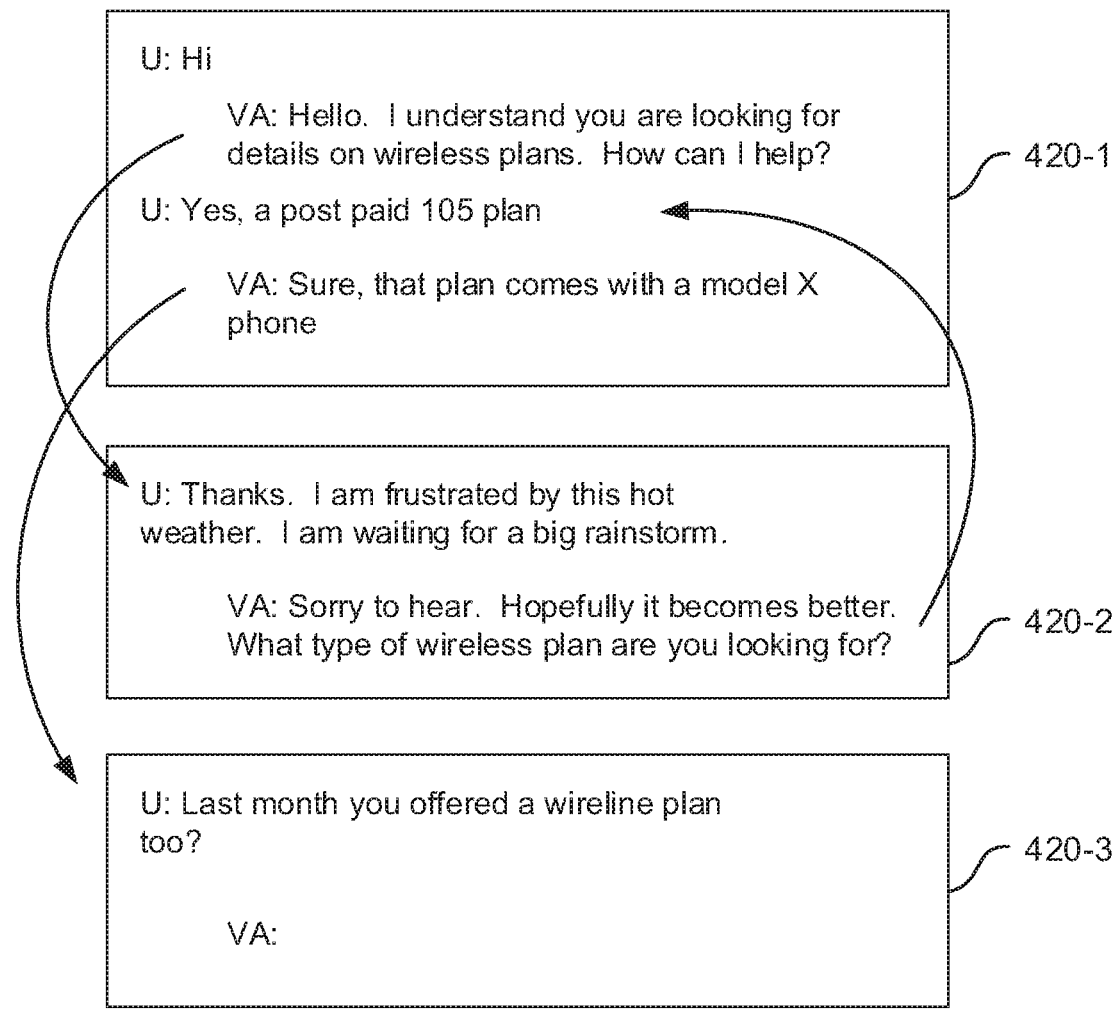
FIG. 4 depicts a virtual agent log data set, according to an example of the principles described herein.

FIG. 4 depicts a virtual agent log data set, according to an example of the principles described herein. As described above, a virtual agent interfaces with a user. FIG. 4 depicts a few examples (420) of such data logs.

In a first example (420-1), a user, U, says "Hi" to which the virtual agent, VA, responds "Hello, I understand you are looking for details on wireless plans. How can I help?" In this first example (420-1), the user responds by stating "Yes, a post paid 105 plan." In this example, the log analysis device (FIG. 2, 204) may perform natural language processing to determine the meaning/intent of the user's statement and provides an appropriate response of "Sure, that plan comes with a model X phone." Following the conversation, or at any point during the conversation, a user may input that the response by the virtual agent was satisfactory or helpful. Accordingly, this log and its associated metadata may be passed to the log analysis device (FIG. 2, 204) to update a training data set of the virtual agent. In other examples, even without the user input, the conversation may be used to update virtual agent performance by, for example, analyzing keywords to determine if the response matches a meaning/intent of the request.

However, in some examples, an error may occur. For example, in a second example (420-2), a user may go off topic. In a specific example, responsive to the virtual agent response of "How can I help?" the user states "Thanks. I am frustrated by this hot weather. I am waiting for a big rainstorm." Clearly, this is unrelated to the topic of wireless plans and if the conversation is not re-directed to wireless plans, the conversation may de-rail and the interaction may be unproductive. Accordingly, in this example (420-2), the natural language processor (FIG. 3, 318) may detect that the request is off-topic, identify what that topic is, and may then take certain actions to tactfully bring the conversation back on topic by stating, "Sorry to hear. Hopefully it becomes better. What type of wireless plan are you looking for?" In this example, the virtual agent was able to appropriately handle the correspondence such that no error occurred. In some examples, this log is stored in the database (FIG. 3, 310) and may be provided to the natural language processor (FIG. 3, 318) as training data by which the natural language processor (FIG. 3, 318) may enhance its performance.

In yet another example (420-3), the user may make a request for information stating, "Last month you offered a wireline plan too?" in this example (420-3), the virtual agent may not provide a response, thus indicating an error. This conversation as well as the error, may be stored in the database (FIG. 3 310) and used by the natural language processor (FIG. 3, 318) as a data point from which future enhanced performance may be effectuated. Thus, as presented in these examples (420), both satisfactory and unsatisfactory conversations may be used to modify future behavior of the virtual agent by 1) storing the logs, 2) analyzing the logs for example via natural language processing, and 3) using the results of the natural language processing to update the virtual agent machine-learning mechanism to provide more accurate, reliable, and relevant responses in subsequent correspondence with users.

Figure 5:
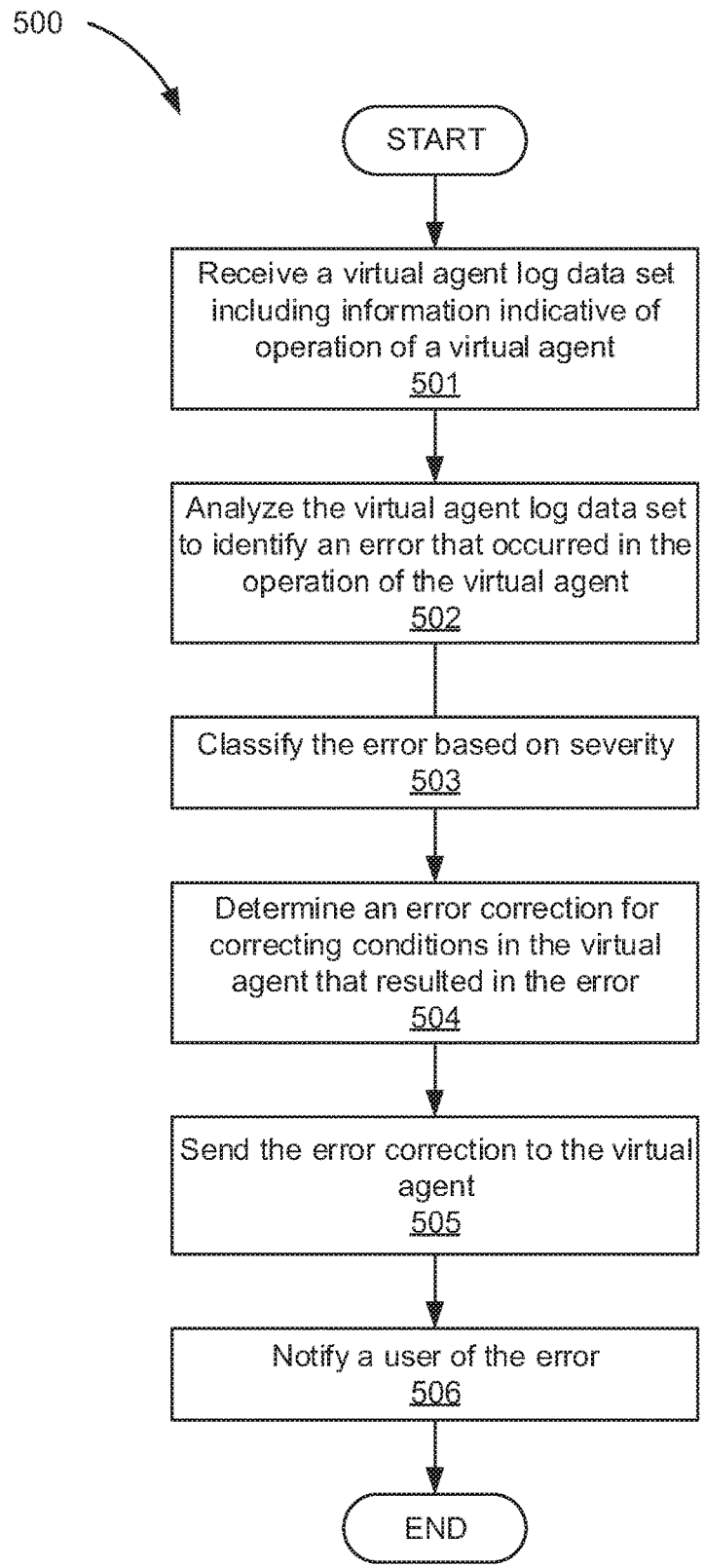
FIG. 5 depicts a flowchart of a method for correcting virtual agent operation via log analysis, according to another example of the principles described herein.

FIG. 5 depicts a flowchart of a method (500) for correcting virtual agent operation via log analysis, according to another example of the principles described herein. According to the method (500) a virtual agent log data set is received (block 501) and analyzed (block 502) to identify an error that occurred in the operation of the virtual agent. These operations may be performed as described above in connection with FIG. 1.

In some examples, the method (500) includes classifying (block 503) the error based on severity. Specifically, the log analysis device (FIG. 2, 204), in addition to identifying the error, may classify the error. Such a classification system provides the ability to define the severity levels of logs across virtual agent nodes and parameters. Classifying (block 503) based on severity may allow for prioritized corrections. That is, those errors that are most severe may be bumped to the top of a queue of error corrections while those that are less severe may be queued behind higher priority errors. As a specific example, the levels of severity may include a low severity, a medium severity, and a high severity.

In one particular example, a severity level may be based on different levels of abstraction. For example, errors may be classified as level 1, level 1 being the node level and errors being classified as warning/critical/severe events. As a specific example, a low severity indicates that a virtual agent did not bring back an off-topic conversation. That is, a level 3 warning may be that a node that is "user driven" meaning it did not bring back the conversation to topics from off topic. A medium severity error may indicate that the virtual agent did not understand a question in a conversation. For example, a level 2 medium event may be an event where the node responded something like "could not understand the question." In another example, a high severity error may indicate that the virtual agent transferred the conversation to a live agent. That is, a sample level is a level 1 critical event being that a node transferred the call to a live agent.

Such classifications can be added to a node profile. That is, each node may be associated with logs generated by that node as well as metadata relating to the node itself and to the logs that were generated. Accordingly, the warnings, medium, or severe events can be captured in the node profile. From this node profile, behavior of the node responses is inferred and the errors associated with that node are generated. For example, it may be determined whether a node is a passthrough always type node indicating that it generally passes off conversations to a live agent rather than handling them itself. As another example, node behavior may indicate nodes that are unable to comprehend abbreviations.

In some examples, the system (FIG. 2, 200) has the ability to assign unique IDs for compound user interactions. That is, a particular conversation with a user may have multiple parts and the system (FIG. 2, 200) may be able to identify errors for partial conversations or for the total utterance. As described above, identifying errors at a higher resolution, i.e., per partial conversation as opposed to an entire conversation, allows for a more tailored error correction to be determined (block 504) and sent (block 505) to the virtual agent.

In some examples, in addition to determining (block 504) and sending (block 505) an error correction, the system may notify (block 506) a user of the error such that corrective action is taken within the virtual agent. That is, in some examples the error correction is done automatically by the system (FIG. 2, 200). However, in certain examples the error correction may rely on additional attention from an administrator. In this example, the notification may serve to trigger action on behalf of the administrator. In other examples, the notification may be merely informational, i.e., a report of errors identified and corrected by the system.

Figure 6:
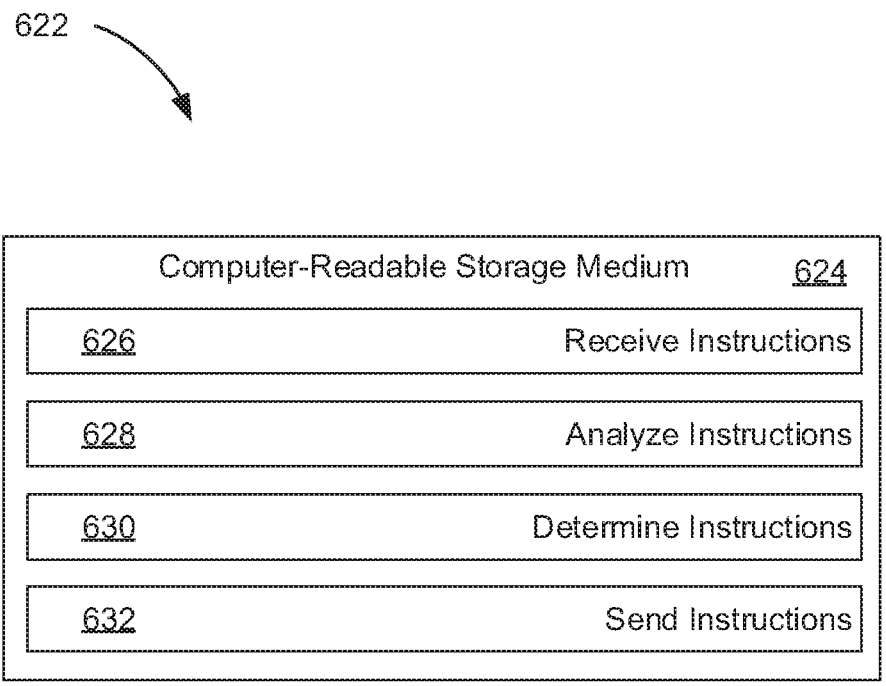
FIG. 6 depicts a computer program product with a computer readable storage medium for correcting virtual agent operation via log analysis, according to an example of principles described herein.

FIG. 6 depicts a computer program product (622) with a computer readable storage medium (624) for correcting virtual agent operation via log analysis, according to an example of principles described herein. To achieve its desired functionality, a computing system includes various hardware components. Specifically, a computing system includes a processor and a computer-readable storage medium (624). The computer-readable storage medium (624) is communicatively coupled to the processor. The computer-readable storage medium (624) includes a number of instructions (626, 628, 630, 632) for performing a designated function. The computer-readable storage medium (624) causes the processor to execute the designated function of the instructions (626, 628, 630, 632).

Referring to FIG. 6, receive instructions (626), when executed by the processor, cause the processor to receive a virtual agent log data set that includes information indicative of operation of a virtual agent. Analyze instructions (628), when executed by the processor, may cause the processor to analyze the virtual agent log data set to identify an error that occurred in the operation of the virtual agent. Determine instructions (630), when executed by the processor, may cause the processor to determine an error correction for correcting conditions in the virtual agent that resulted in the error. Send instructions (632), when executed by the processor, may cause the processor to send the error correction to the virtual agent.

Figure 7:
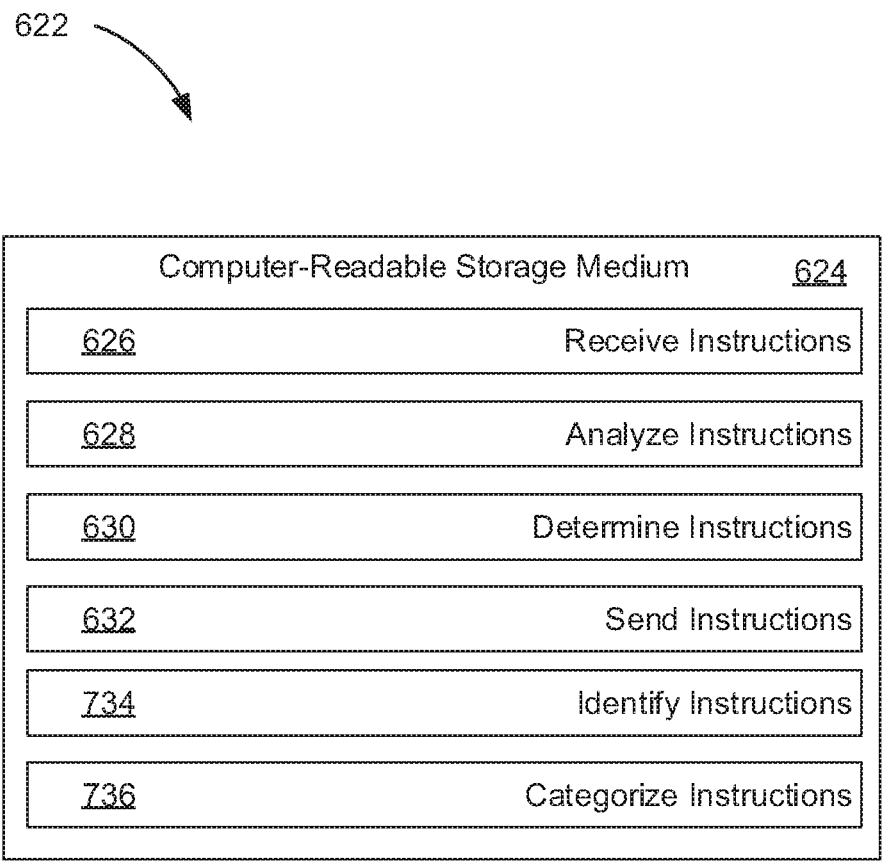
FIG. 7 depicts a computer program product with a computer readable storage medium for correcting virtual agent operation via log analysis, according to another example of principles described herein.

FIG. 7 depicts a computer program product (622) with a computer readable storage medium (624) for correcting virtual agent operation via log analysis, according to another example of principles described herein. In addition to the instructions described above in FIG. 6, the computer-readable storage medium (624) depicted in FIG. 7 includes additional instructions (734, 736). Identify instructions (734), when executed by the processor, may cause the processor to provide an identification of the conversation such that the error is identifiable by the conversation in which it occurred. Categorize instructions (736), when executed by the processor, may cause the processor to categorize the errors per node to determine node behavioral patterns.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. In one example, the computer usable program code may be embodied within a computer readable storage medium; the computer readable storage medium being part of the computer program product. In one example, the computer readable storage medium is a non-transitory computer readable medium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a virtual agent log data set of a virtual agent which is to interact with a human user, the virtual agent log data set comprising:
   information indicative of operation of a virtual agent; and
   correspondence between the virtual agent and the human user;
   analyzing, by machine logic, the virtual agent log data set to identify an error that occurred in the correspondence between the virtual agent and the human user;
   determining, by machine logic, an error correction for correcting conditions in the virtual agent that resulted in the error; and
   sending the error correction to the virtual agent.

2. The computer-implemented method of claim 1, further comprising classifying the error based on severity.

3. The computer-implemented method of claim 2, wherein a low severity error indicates the virtual agent did not bring back an off-topic conversation.

4. The computer-implemented method of claim 2, wherein a medium severity error indicates the virtual agent did not understand a correspondence in a conversation.

5. The computer-implemented method of claim 2, wherein a high severity error indicates the virtual agent incorrectly transferred the conversation to a live agent.

6. The computer-implemented method of claim 1, wherein analyzing the virtual agent log data comprises performing natural language processing on the virtual agent log data set.

7. The computer-implemented method of claim 6, wherein determining an error correction for correcting conditions in the virtual agent comprises:
   adding a conversation that includes the error to a training data set; and
   flagging the conversation as an example of an incorrect response.

8. The computer-implemented method of claim 7, wherein sending the error correction to the virtual agent comprises updating a natural language processor based on an updated training data set.

9. The computer-implemented method of claim 1, further comprising notifying a user of the error.

10. A system, comprising:
    a log capture device to receive a virtual agent log data set of a virtual agent which is to interact with a human user, the virtual agent log data set comprising:
    information indicative of operation of a virtual agent; and
    correspondence between the virtual agent and the human user;
    a log analysis device to:
    analyze the virtual agent log data set to identify an error that occurred in the correspondence between the virtual agent and the human user;
    classify the error as a low severity error, a medium severity error, or a high severity error;
    determine an error correction for correcting conditions in the virtual agent that resulted in the error; and
    send the error correction to the virtual agent; and
    a controller to manage operation of the log capture device and the log analysis device.

11. The system of claim 10, wherein the virtual agent interacts with a user via at least one of auditory and textual communication.

12. The system of claim 10, further comprising a database to store virtual agent log data sets, identified errors, and classifications of the identified errors.

13. The system of claim 12, further comprising a user interface to allow a user to view and inspect the database.

14. The system of claim 12, wherein the database is searchable.

15. The system of claim 10, wherein the log analysis device identifies the errors based on a node of the virtual agent where they originate.

16. The system of claim 10, further comprising a consolidator to hierarchically group errors.

17. The system of claim 10, further comprising a natural language processor to:
    receive information regarding an identified error; and
    update a natural language operation based on the identified error.

18. A computer program product for managing a virtual agent, the computer program product comprising a computer readable storage medium having program instructions embodied therewith, the program instructions executable by a processor, to cause the processor to:
    receive, by the processor, a virtual agent log data set of a virtual agent which is to interact with a human user, the virtual agent log data set comprising:
    information indicative of operation of a virtual agent; and
    correspondence between the virtual agent and the human user;
    analyze, by the processor, the virtual agent log data set to identify an error that occurred in the correspondence between the virtual agent and the human user;
    classify the error as a low severity error, a medium severity error, or a high severity error;
    capture the error and error classification in a node profile associated with a node where the error occurred;
    group, by the processor, similar errors that occurred in the operation of the virtual agent;
    determine, by the processor, an error correction for correcting conditions in the virtual agent that resulted in the error; and
    send, by the processor, the error correction to the virtual agent.

19. The computer program product of claim 18, wherein the program instructions are further executable by the processor to cause the processor to provide an identification of a conversation such that the error is identifiable by the conversation in which it occurred.

20. The computer program product of claim 18, wherein the program instructions are further executable by the processor to cause the processor to categorize the errors per node to determine node behavioral patterns.

* * * * *